US005761435A

United States Patent [19]
Fukuda et al.

[11] Patent Number: 5,761,435
[45] Date of Patent: Jun. 2, 1998

[54] MULTIPROCESSOR BRIDGE HAVING STORAGE FOR SPANNING TREE OPERATION MODE INFORMATION INDICATING WHETHER EACH PORT OF THE BRIDGE IS OPERABLE UNDER SPANNING TREE PROTOCOL

[75] Inventors: Masashi Fukuda, Hadano; Shigeki Morimoto, Atugi; Toshihiko Murakami, Yokohama; Takunori Yoneno, Hadano; Hideyuki Matsuo, Taga-gun; Hirpyuki Sakoda, Hadano, all of Japan

[73] Assignees: Hitachi, Ltd., Tokyo; Hitachi Computer Engineering Co., Ltd., Kanagawa-ken, both of Japan

[21] Appl. No.: 401,898

[22] Filed: Mar. 10, 1995

[30] Foreign Application Priority Data

Mar. 17, 1994 [JP] Japan .................................... 6-046735

[51] Int. Cl.$^6$ ........................................................ G06F 13/00
[52] U.S. Cl. ............................ 395/200.68; 370/401
[58] Field of Search ............................ 370/85.13, 85.14, 370/401, 402, 403, 404, 405, 256, 390, 397, 408, 428; 395/200.02, 200.15, 200.01, 200.03, 200.1, 200.11, 200.19, 200.68, 200.75, 200.76

[56] References Cited

U.S. PATENT DOCUMENTS

| | | | |
|---|---|---|---|
| 4,706,080 | 11/1987 | Sincoskie | 340/825.02 |
| 5,018,137 | 5/1991 | Backes et al. | 370/401 |
| 5,195,181 | 3/1993 | Bryant et al. | 395/200.15 |
| 5,280,480 | 1/1994 | Pitt et al. | 370/256 |
| 5,448,565 | 9/1995 | Chang et al. | 370/402 |
| 5,490,252 | 2/1996 | Macera et al. | 395/200.79 |
| 5,500,860 | 3/1996 | Perlman et al. | 370/401 |
| 5,515,376 | 5/1996 | Murthy et al. | 370/402 |

OTHER PUBLICATIONS

ANSI/IEEE Std. 802.1D, 1990, Media Access Control (MAC) Bridges, published Mar. 8, 1991, pp. 31–39.
Transparent MAC Bridge Installation Standards, Transparent MAC Bridge V3.0, OSI Repeating and RDJ Installation Standards, Jun. 1993, pp. 1–19.
Simplified MAC Bridge Installation Standards, Simplified MAC Bridge V3.0, OSI Repeating and RSJ Installation Standards, Jun. 1993, pp. 1–19.
"A Modular Architecture for Performance Enhancement in Extended Local Area Network", Catania et al, IEEE, vol. 42, No. 1, Mar. 93.
"Reducing the Diameters of Computer Networks", Bokhari et al, IEEE vol. C–35, No. 8 Aug. 1986.

*Primary Examiner*—Moustafa M. Meky
*Attorney, Agent, or Firm*—Fay, Sharpe, Beall, Fagan, Minnich & McKee

[57] ABSTRACT

A multiprocessor bridge construction allows ports that are operable under a spanning tree protocol to coexist with ports that are inoperable under the spanning tree protocol, thus making it possible to improve the frame-repeating capability of the bridge, to equip the bridge with a large number of ports, and to divide the spanning tree topology into a plurality of portions to be managed.

17 Claims, 7 Drawing Sheets

FIG. 8

| PORT NO. | SPANNING TREE OPERATION MODE |
|---|---|
| | |
| | |

FIG. 9

| PORT NO. | PORT STATUS |
|---|---|
| | |
| | |

MULTIPROCESSOR BRIDGE HAVING STORAGE FOR SPANNING TREE OPERATION MODE INFORMATION INDICATING WHETHER EACH PORT OF THE BRIDGE IS OPERABLE UNDER SPANNING TREE PROTOCOL

BACKGROUND OF THE INVENTION

1. Field of the Invention

The present invention relates to a network system and, more particularly, to a bridge of multiprocessor construction that manages a large-scale network by dividing it into a plurality of spanning trees.

2. Description of the Related Art

The operation model of bridges is defined in IEEE 802.1D (ANSI/IEEE Std. 802.1D—1990; Media Access Control (MAC) Bridges; Mar. 8, 1991). Specifically, the bridge as defined receives frames from individual ports, repeats the frames, learns the addresses therefrom, and filters the frames by use of a frame-repeating function and a filtering database unique to that bridge. The bridge model thus defined relates only to the single-processor bridge scheme.

Bridges that execute a spanning tree protocol are stipulated by a foundation called INTAP (Interoperability Technology Association for Information Processing) in its Transparent MAC Bridge Installation Standards (Transparent MAC Bridge V3.0, OSI Repeating and RDJ Installation standards; June 1993). According to the stipulation, all ports of a given bridge participate in a spanning tree.

Meanwhile, bridges that do not execute the spanning tree protocol are defined by INTAP in its Simplified MAC Bridge Installation Standards (Simplified MAC Bridge V3.0, OSI Repeating and RSJ Installation Standards; June 1993). According to this definition, none of the ports of a given bridge participates in a spanning tree.

Conventional bridges use a single processor both to execute the spanning tree protocol and to repeat frames. One disadvantage of this scheme is that the capability of repeating frames is reduced by the time required to perform spanning tree calculations. Further, the total number of ports that may be accommodated by a bridge is dependent on the frame-repeating capability of that bridge, with the maximum number of ports being limited by the performance of the processor. This represents another disadvantage of the prior art: the single-processor scheme cannot cope with a large number of ports. Since it is not possible for the conventional bridge, in operation, to mix the ports that are operable (active) and those that are inoperable (inactive) under the spanning tree protocol, a further disadvantage of the prior art has been recognized. That is, in the prior art, a large-scale network cannot be divided into a plurality of spanning trees to be managed.

SUMMARY OF THE INVENTION

It is therefore an object of the present invention to provide a bridge of multiprocessor construction which improves the frame-repeating capability by having one processor perform spanning tree protocol calculations and another processor repeat frames communicated between terminals, whereby the constraint on the total number of ports accommodated by the bridge is substantially eliminated. The bridge further permits the coexistence of both operable and inoperable ports under the spanning tree protocol so that the spanning tree may be divided into a plurality of portions to be managed.

To achieve the foregoing and other objects of the present invention, and according to one aspect thereof, a multiprocessor bridge comprises at least one bridging processor connected to ports for repeating frames, a spanning tree protocol processor for executing the spanning tree protocol, and communication means for permitting communication between the bridging processor and the spanning tree protocol processor.

In a preferred structure according to the invention, the bridge includes a plurality of bridging processors each having a filtering database. Each bridging processor updates its filtering database in synchronism with the other bridging processors inside the bridge, so that the contents of all filtering databases within the bridge are kept identical.

In another preferred structure according to the invention, the spanning tree protocol processor holds spanning tree operation mode information indicating whether each of the ports within the bridge is operable under the spanning tree protocol, and each bridging processor holds spanning tree operation mode information indicating whether each of the ports connected to that bridging processor is operable under the spanning tree protocol.

When the spanning tree protocol facility and the frame-repeating facility (or bridging facility) are each composed of a separate processor, the spanning tree protocol calculations may be performed by one processor while frames are repeated by another processor. This boosts the frame-repeating capability easily and appreciably. Furnishing a plurality of bridging facilities virtually eliminates the conventional constraints on the number of ports accommodated by a single bridge, whereby a multi-port bridge is obtained. When the spanning tree protocol facility and the bridging facility each retain spanning tree operation mode information, the ports that are operable under the spanning tree protocol can coexist with ports that are inoperable under the spanning tree protocol. Thus, the spanning tree can be divided into a plurality of portions to be managed.

BRIEF DESCRIPTION OF THE DRAWINGS

FIG. 8 shows an example of spanning tree operation mode information;

FIG. 9 shows an example of port status information; and

DETAILED DESCRIPTION OF THE PREFERRED EMBODIMENTS

A preferred embodiment of the invention will now be described with reference to the accompanying drawings.

Figure 1:
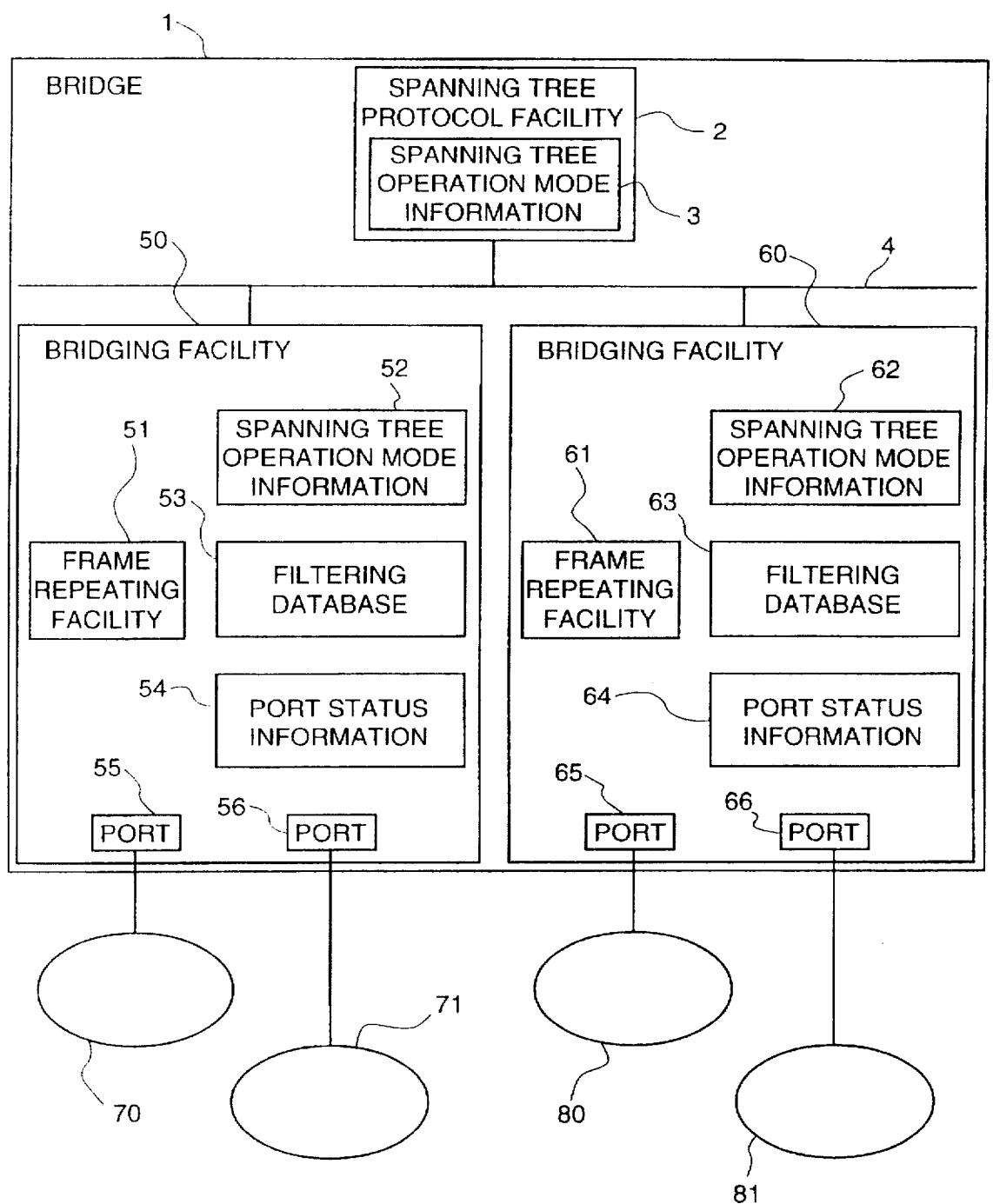
FIG. 1 is a schematic diagram of a multiprocessor bridge construction embodying the invention.

FIG. 1 is a schematic diagram of a multi-processor construction bridge embodying the invention. In FIG. 1, a bridge 1 comprises a spanning tree protocol facility 2, a bus 4, and bridging facilities 50 and 60. The spanning tree protocol facility 2 holds spanning tree operation mode information 3. The bridging facilities 50 and 60 hold spanning tree operation mode information 52 and 62, frame-repeating facilities 51 and 61, filtering databases 53 and 63, port status information 54 and 64, and ports 55, 56, 65 and 66. The ports 55, 56, 65 and 66 are connected to networks 70, 71, 80 and 81, respectively. The spanning tree protocol facility 2 and the frame-repeating facilities 51 and 61 are each composed of a separate processor. The spanning tree operation mode information 3, 52 and 62; the filtering databases 53 and 63; and the port status information 54 and 64 are held in suitable storage devices such as memories. Alternatively, the frame-repeating features, ports and memories may constitute an integral portion while the bridging facilities 50 and 60 may each contain a separate processor.

Figure 2:
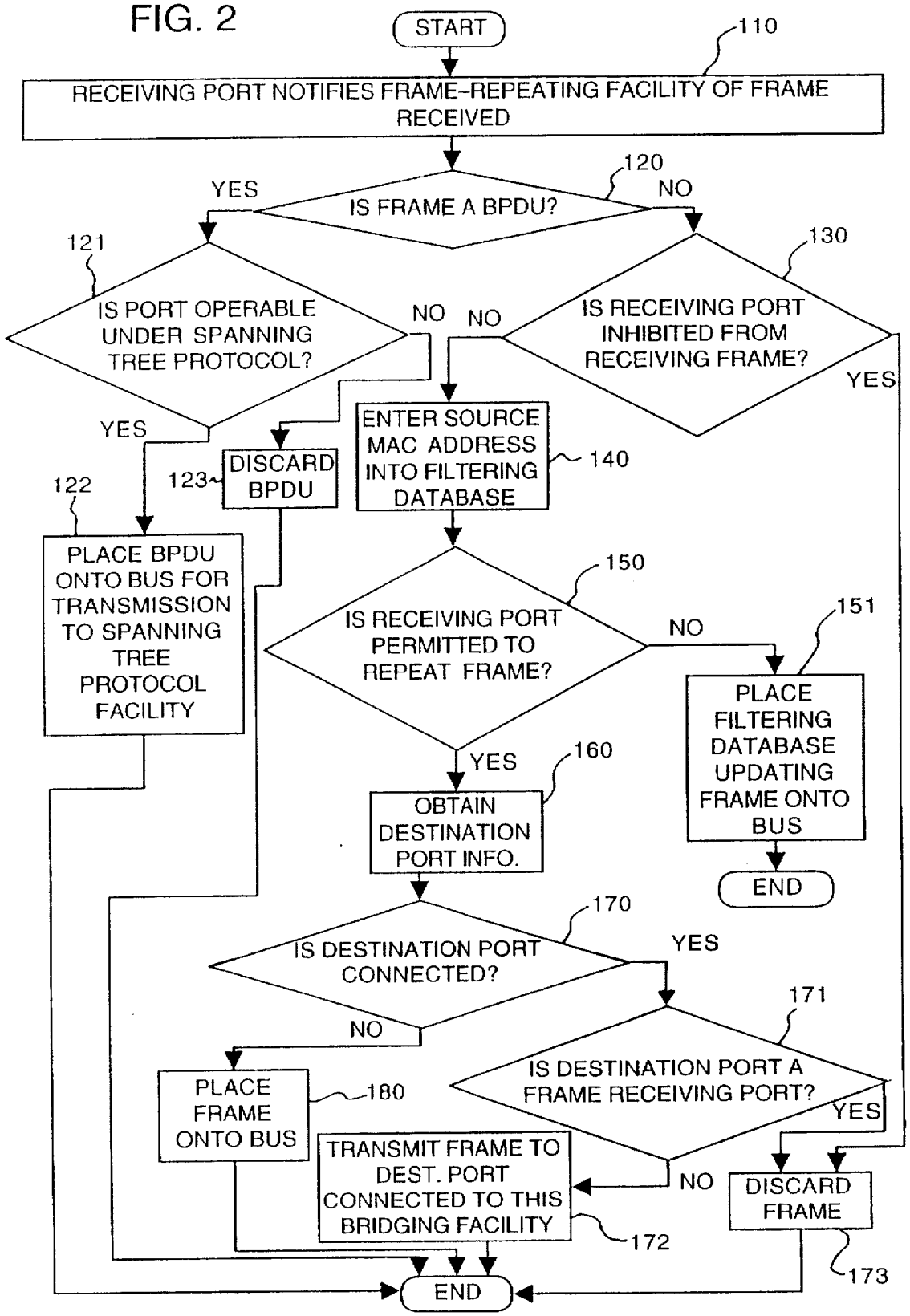
FIG. 2 is a flowchart of steps performed by a bridging facility upon receipt of a frame from a network.
Figure 3:
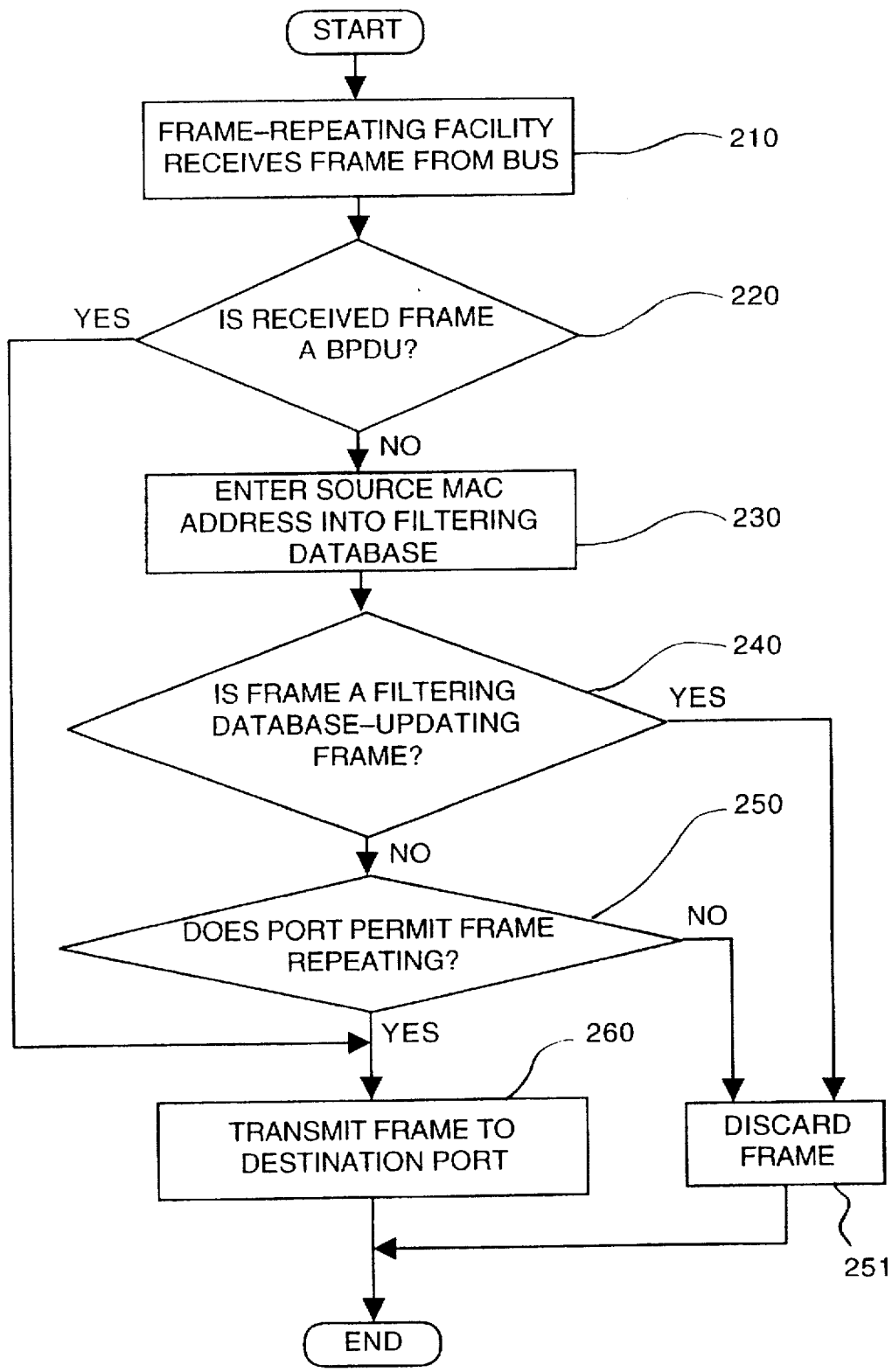
FIG. 3 is a flowchart of steps performed by another bridging facility upon receipt of the frame from a bus.

How the bridge 1 repeats frames and how a frame received by the port 55 is transmitted to port 65 will first be described with reference to FIGS. 2 and 3. FIG. 2 is a flowchart of steps performed by the bridging facility 50 upon receipt of a frame from the network 70. FIG. 3 is a flowchart of steps carried out by the bridging facility 60 upon receipt of the frame from the bus 4.

When receiving the frame from the network 70, the port notifies the frame-repeating facility 51 that the frame was received (Step 110). In response, the frame-repeating facility 51 checks to see if the frame is a bridge protocol data unit (called BPDU hereunder) subject to spanning tree protocol calculations (Step 120).

If the frame is not a BPDU, then it is to be repeated by the bridge 1, and the frame-repeating process continues. The frame-repeating facility 51 references the port status information 54 to see if the port 55 that received the frame is inhibited from repeating the frame (Step 130). If the port 55 is found to be inhibited from repeating the frame, the frame is discarded (Step 173), and the frame-repeating process is terminated.

If the port 55 is not inhibited from repeating the frame, the source MAC address of the frame is determined; i.e., the MAC address is entered into the filtering database 53 (Step 140). Then a check is made to see if the port 55 that received the frame permits frame-repeating operation (Step 150).

If the port 55, having received the frame, is not permitted to repeat the frame, the frame-repeating facility 51 places a filtering database-updating frame onto the bus 4 (Step 151), and terminates the frame-repeating process. Step 151 allows each of the bridging facilities inside the bridge 1 to receive the filtering database-updating frame from the bus 4, whereby the filtering databases of all bridging facilities within the bridge 1 are synchronized. Specifically, each bridging facility updates its own filtering database on the basis of the received filtering database-updating frame, with the result that the contents of all filtering databases are kept identical at all times.

If the port 55 that received the frame permits the frame-repeating operation, the frame-repeating facility 51 obtains information designating the destination port of that frame by searching through the filtering database 53 (Step 160). Then, a check is made to see if the destination port is connected to this bridging facility 50 (Step 170).

If the destination port is found to be one of the ports included in this bridging facility 50, a check is made to see if the destination port is the port 55 that received the frame (Step 171). If the destination port is not the port 55 that received the frame, the frame is transmitted to the destination port included in this bridging facility 50 (Step 172), and the frame-repeating process is terminated. If the destination port is the port 55 that received the frame, the frame is discarded (Step 173), and the frame-repeating process is terminated. If the destination port is not any of the ports included in this bridging facility 50, the frame is transmitted to the destination port via the bus 4 (Step 180). This completes the processing by the bridging facility 50, and control is passed on to the bridging facility 60.

The frame-repeating facility 61 of the bridging facility 60 receives the frame repeated via the bus 4 (Step 210). A check is made to see if the received frame is a BPDU (Step 210). If the frame is not a BPDU, the source MAC address of the frame is determined and is entered into the filtering database 63 (Step 230).

A check is then made to see if the frame is a filtering database-updating frame (Step 240). If the frame is found to be a filtering database-updating frame, that frame is discarded (Step 251), and the processing is terminated. If the frame is not a filtering database-updating frame, the frame-repeating facility 61 references the port status information 64 to see if the port to which the frame is destined permits a frame-repeating operation (Step 250). If the destination port does not permit the frame to be repeated, the frame is discarded (Step 251), and the processing is terminated. If the destination port is found to permit the frame to be repeated, the frame is transmitted to the destination port (port 65 in this example) (Step 260) for transfer to the connected network (network 80 in this example). This is how the frame repeating operation takes place between the bridging facilities 50 and 60 via the bus 4.

FIG. 9 is a view showing typical port status information. When the frame-repeating facility 51 or 61 receives a frame from a port or when either of the facilities sends a frame to a port, the facility searches through the port status information to find the entry matching the port number 710, and references the port status 720 of the matched entry. This allows the frame-repeating facility to verify if the port in question permits the frame repeating operation.

With reference to FIGS. 2 and 3, the port 55 that has received a frame from the network 70 notifies the frame-repeating facility 51 of that frame (Step 110). This prompts the frame-repeating facility 51 to verify if the frame is a BPDU (Step 120). If the frame is found to be a BPDU, the frame-repeating facility 51 references the spanning tree operation mode information 52 to see if the port 55 is operable under the spanning tree protocol (Step 121). If the port 55 is found to be inoperable under the spanning tree protocol, the BPDU is discarded (Step 123), and the processing is terminated. If the port 55 is found to be operable under the spanning tree protocol, the frame-repeating facility 51 transmits the BPDU over the bus 4 to the spanning tree protocol facility 2 (Step 122).

On receiving the BPDU, the spanning tree protocol facility 2 performs spanning tree protocol calculations. If the result of the calculations requires that the BPDU be transmitted through, for example, the port 56, the BPDU is transmitted over the bus 4 to the bridging facility 50.

The frame-repeating facility 51 of the bridging facility 50 then receives the frame from the bus 4 (Step 210), and checks to see if the received frame is a BPDU (Step 220). If the frame is found to be a BPDU, it is transmitted to the destination port 56 (Step 260). In turn, the port 56 forwards the BPDU to the network 70.

The destination port of the BPDU depends on the construction and status of the spanning tree applicable to the network group to which the bridge 1 is connected. Generally, the BPDU is transmitted from the root of the spanning tree toward its ends.

Figure 4:
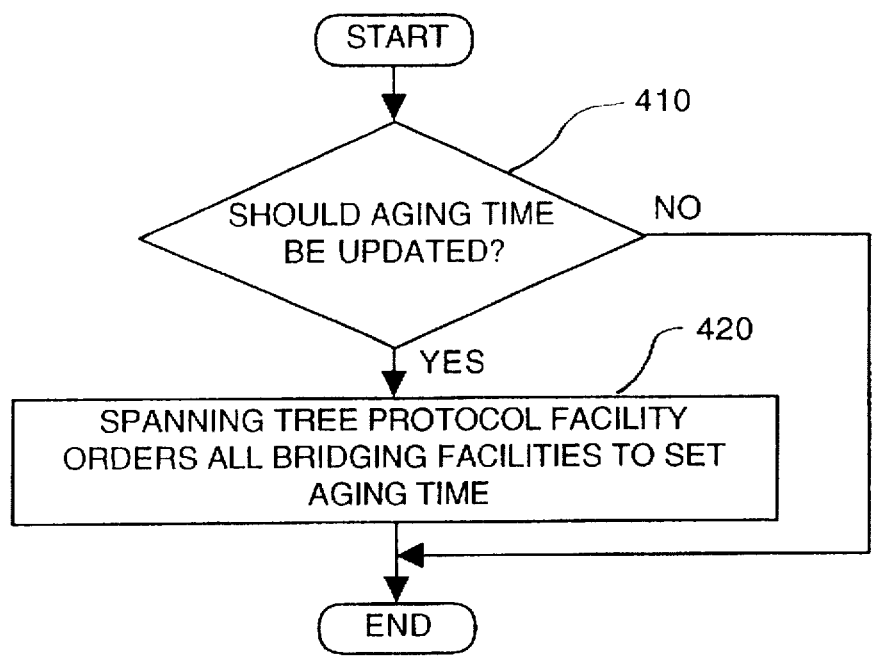
FIG. 4 is a flowchart of steps performed by the spanning tree protocol facility when it orders the setting of an aging time.
Figure 5:
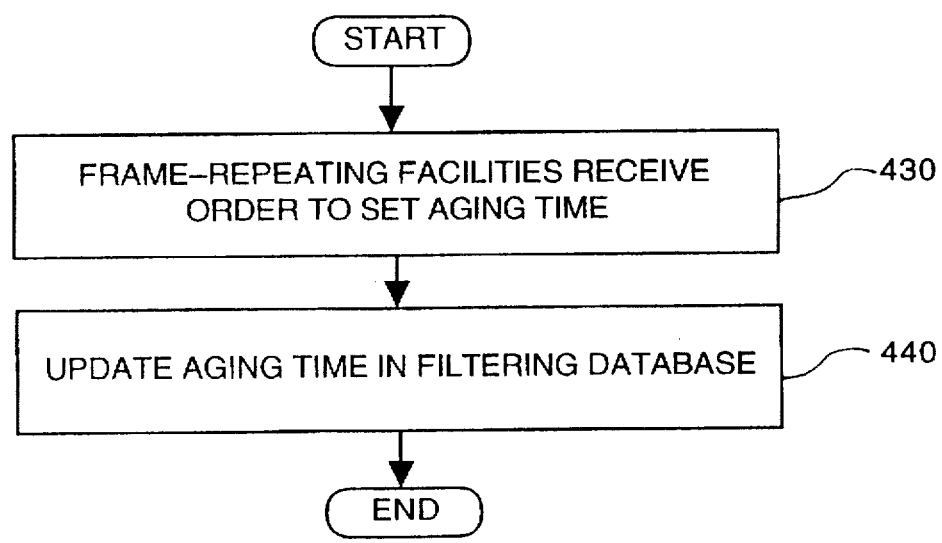
FIG. 5 is a flowchart of steps performed by a frame-repeating facility when it receives an aging time setting order from the bus.

The following is a description, with reference to FIGS. 4 and 5, of how an aging time value of the filtering database is changed as a result of the spanning tree protocol calculations.

The spanning tree protocol calculations are performed in such events as the receipt of a BPDU and a time-out on the timer used by the spanning tree protocol. After the calculations, a check is made to see if the aging time must be changed (Step 410). If such a change is found to be necessary, the spanning tree protocol facility 2 orders all bridging facilities 50 and 60, via the bus 4, to change the aging time value (Step 420). At this point, any bridging facility whose ports are all inoperable under the spanning tree protocol is also given the order to change the aging time value, so that the filtering databases of all bridging facilities are synchronized. When the frame-repeating facilities 51 and 61 of the bridging facilities 50 and 60 receive the order to change the aging time value from the spanning tree protocol facility 2 (Step 430), the facilities 51 and 61 update the aging time value in their respective filtering databases 53 and 63 (Step 440).

Figure 6:
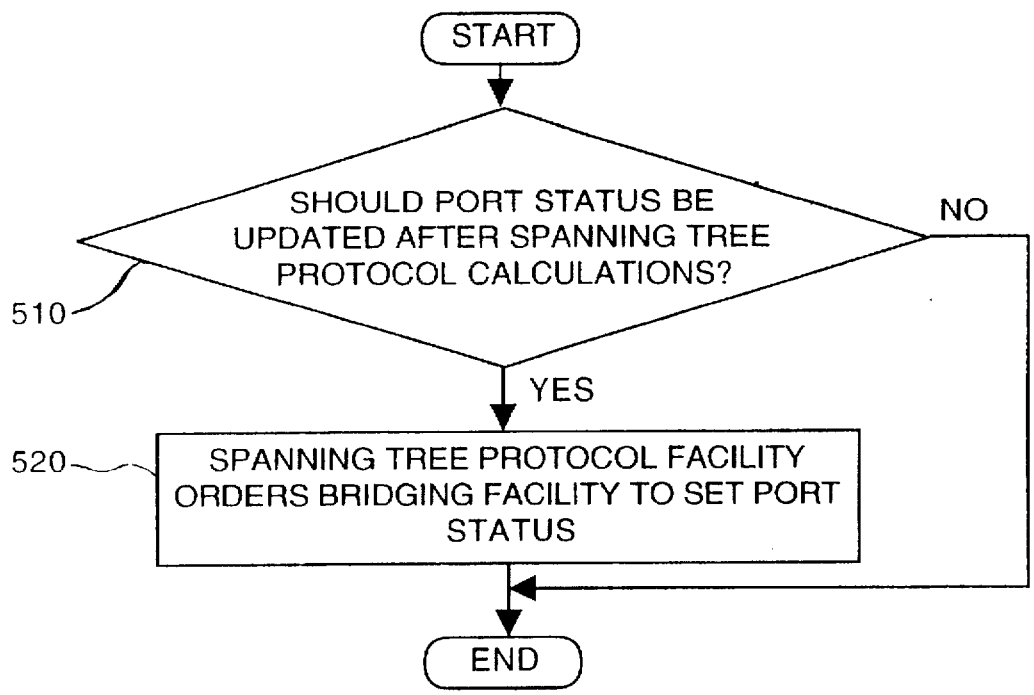
FIG. 6 is a flowchart of steps performed by the spanning tree protocol facility when it orders the setting of port status information.
Figure 7:
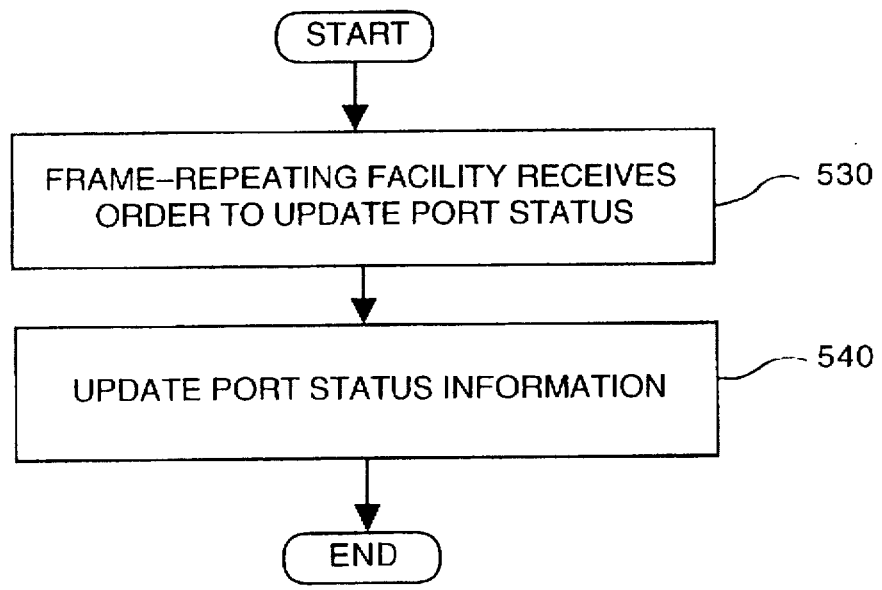
FIG. 7 is a flowchart of steps performed by a frame-repeating facility when it receives an order to set port status information from the bus.

FIGS. 6 and 7 explain the update of the port status of the port 55, as a result of the spanning tree protocol calculations. After the spanning tree protocol calculations are performed, the spanning tree protocol facility 2 checks to see if the port 55 needs to have its port status updated (Step 510). If an update is found to be necessary, the spanning tree protocol facility 2 orders the bridging facility 50, via the bus 4, to set the port status of the port 55 (Step 520). When the bridging facility 50 receives the order from the bus 4 (Step 530), the frame-repeating facility 51 updates the port status information on the port 55 according to that order (Step 540).

FIG. 8 depicts a typical example of spanning tree operation mode information. When performing the spanning tree protocol calculations, the spanning tree protocol facility 2 references a spanning tree operation mode 620 within the spanning tree operation mode information. This allows only the port having the port number 610, which indicates an operable port under the spanning tree protocol, to take part in the spanning tree calculations. If the received frame is a BPDU, the frame-repeating facilities 51 and 61 search for and find the entry matching the port number 610 of the port that received the frame. Through reference to the spanning tree operation mode 620 of the matched entry, a check is made to see if the port in question is operable under the spanning tree protocol. In this manner, it is possible for the spanning tree protocol facility 2 and the frame-repeating facilities 51 and 61 to individually recognize the spanning tree operation mode of a given port. The ports participating in the buildup of a spanning tree topology can then coexist with the nonparticipating ports inside a single bridge.

Figure 10:
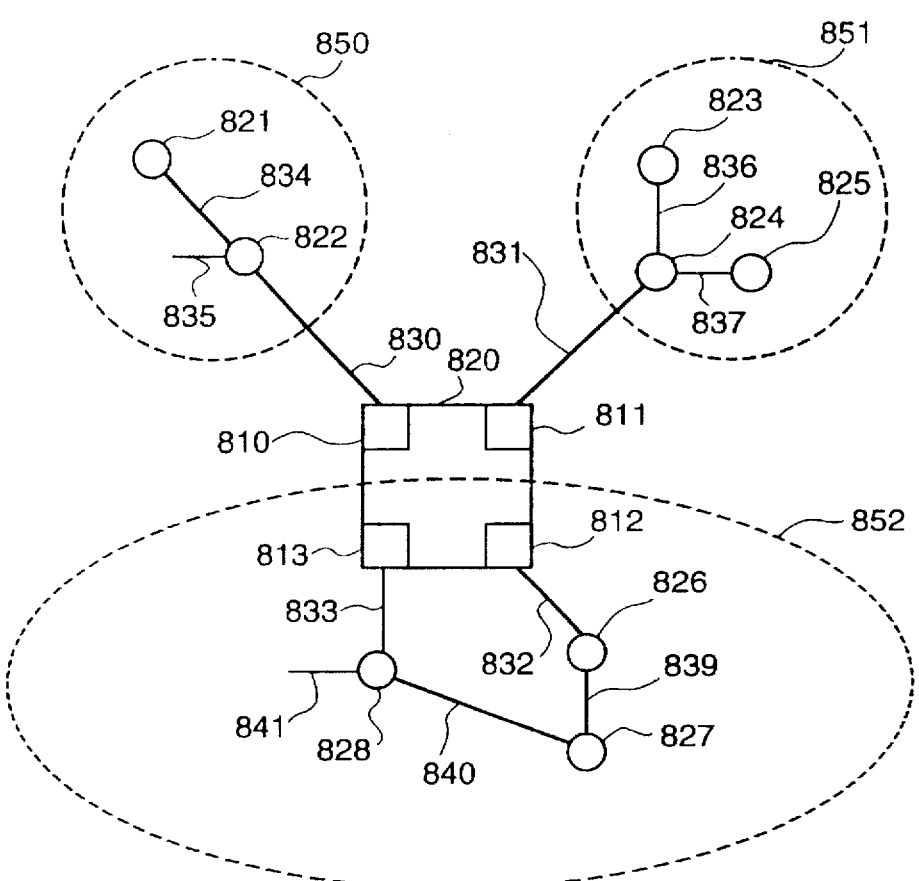
FIG. 10 shows an example of a spanning tree construction constituting a large-scale network in which ports that are operable under the spanning tree protocol coexist with ports that are inoperable under the spanning tree protocol.

FIG. 10 shows a typical example of a spanning tree construction constituting a large-scale network, in which ports that are operable under the spanning tree protocol coexist with ports that are inoperable under the spanning tree protocol. Ports 810 and 811 are examples of the latter, whereas ports 812 and 813 are examples of the former. Because all BPDUs are discarded at the ports 810 and 811, these ports constitute separate respective spanning tree topologies 850 and 851. Since all BPDUs received by the ports 812 and 813 are used in the spanning tree protocol calculations, the topology of a spanning tree 852 may involve both ports 812 and 813.

Although the above-described embodiment has two bridging facilities which each include two ports, three or more bridging facilities each having three or more ports may constitute the bridge.

Equipped with both the spanning tree protocol processor and the bridging processor, the bridge carries out two distinct processes independently: performing spanning tree protocol calculations and repeating frames. Because there is no need to perform spanning tree protocol calculations while frames are being repeated, the frame repeating capability is boosted by the time saved by eliminating the time that has been conventionally required to perform the calculations. Furnishing a plurality of bridging processors also makes it possible to easily increase the number of connected ports, independently of the frame processing capability of a single processor. Because the spanning tree operation mode information is held by both the spanning tree processor and the bridging processors, the ports that participate in the buildup of a spanning tree topology may be easily identified. It follows that both the ports that are operable and those that are inoperable under the spanning tree protocol can coexist within a single bridge.

Although specific details of the invention have been described by way of the preferred embodiments, one of ordinary skill in the art will recognize modifications to the invention based upon the foregoing disclosure. All such modifications that rely upon the teachings by which the present invention has advanced the state of the art are properly considered within the spirit and scope of the invention.

We claim:

1. A multiprocessor bridge having a plurality of ports each connected to a network for transmitting and receiving frames to and from said network, and a filtering database for holding filtering information by which to filter said frames transmitted and received through said ports, said multiprocessor bridge repeating said frames between terminals connected via the network and executing a spanning tree protocol, comprising:

at least one bridging facility each including a bridging processor operatively connected to said plurality of ports for repeating said frames;

a spanning tree protocol processor for executing said spanning tree protocol; and communication means via which said frames are transmitted and received between each said bridging processor and said spanning tree protocol processor;

wherein said spanning tree protocol processor has a first storage for spanning tree operation mode information indicating whether each of said ports within the bridge is operable under said spanning tree protocol; and wherein each said bridging facility has a second storage for spanning tree operation mode information indicating whether each of said ports is operable under said spanning tree protocol.

2. A multiprocessor bridge according to claim 1, wherein each said bridging facility comprises first and second transmission means;

said first transmission means for determining whether a frame, received through any one of said ports connected to the bridging processor of the bridging facility receiving the frame, is a bridge protocol data unit subject to spanning tree protocol calculations, for determining, when the received frame is found to be a bridge protocol data unit, whether the port through which said frame was received is operable under said spanning tree protocol, and for transmitting the received frame via said communication means to said spanning tree protocol processor when said port through which said frame was received is found to be operable under said spanning tree protocol;

said second transmission means for determining whether a frame received via said communication means from said spanning tree protocol processor is a bridge protocol data unit, and for transmitting said frame received from said spanning tree protocol processor to a destination port designated by said frame received from said spanning tree protocol processor when said frame received from said spanning tree protocol processor is found to be a bridge protocol data unit;

wherein said spanning tree protocol processor comprises third transmission means for determining whether the frame transmitted via said communication means from any one of said at least one bridging facility is a bridge protocol data unit, for performing said spanning tree protocol calculations when the frame transmitted from said bridging facility is found to be a bridge protocol data unit, and for transmitting said frame found to be a bridge protocol data unit to the bridging facility connected to the port which is connected to a destination network designated through said spanning tree protocol calculations.

3. A multiprocessor bridge according to claim 1, wherein each said bridging facility comprises means for holding port status information derived from calculations performed by said spanning tree protocol processor regarding each of said ports within that bridging facility.

4. A multiprocessor bridge according to claim 1, wherein said plurality of ports include ports that are operable under the spanning tree protocol and ports that are inoperable under the spanning tree protocol.

5. A multiprocessor bridge having a plurality of ports each connected to a network for transmitting and receiving frames to and from said network, and a filtering database for holding filtering information by which to filter said frames transmitted and received through said ports, said multiprocessor bridge repeating said frames between terminals connected via the network and executing a spanning tree protocol, comprising:

a plurality of bridging facilities each including a bridging processor operatively connected to said plurality of ports for repeating said frames, each of said bridging processors being operatively connected to said plurality of ports;

a spanning tree protocol processor for executing said spanning tree protocol; and communication means via which said frames are transmitted and received between each said bridging processor and said spanning tree protocol processor.

6. A multiprocessor bridge according to claim 5, wherein each of said bridging facilities includes a filtering database and filtering database synchronization means for updating the filtering database, in synchronism with an update of the filtering databases of all other bridging facilities within the bridge, so that the contents of the filtering databases of all bridging facilities within the bridge are kept identical.

7. A multiprocessor bridge according to claim 6, wherein each said filtering database synchronization means comprises notification means for notifying the other bridging facilities within the bridge of any filtering database update in its bridging facility, and update means for updating the filtering database of its bridging facility in accordance with a filtering database update notice from the notification means of any other bridging facility within the bridge.

8. A network system having a plurality of networks and at least one bridge for interconnecting said networks, each said bridge comprising:

a plurality of ports for transmitting and receiving frames to and from said networks;

a filtering database for holding filtering information by which to filter said frames;

execution means for executing a spanning tree protocol;

repeating means for repeating said frames between terminals connected over said networks; and a first storage for spanning tree operation mode information indicating whether each of said ports within said bridge is operable under said spanning tree protocol;

wherein each said bridge includes a spanning tree protocol processor including said execution means and said first storage, and a bridging facility including said filtering database, said repeating means, and a second storage for said spanning tree operation mode information; and wherein said plurality of ports include ports that are operable under said spanning tree protocol and ports that are inoperable under said spanning tree protocol, coexisting within each said bridge.

9. A network system according to claim 8, wherein said execution means is a first processor, and said repeating means is a second processor.

10. A network system according to claim 8, wherein each said bridging facility further includes first and second transmission means;

said first transmission means for determining whether a frame received through any one of said ports is a bridge protocol data unit subject to spanning tree protocol calculations, for determining, when the received frame is found to be a bridge protocol data unit, whether the port through which said frame was received is operable under said spanning tree protocol, and for transmitting the received frame to said spanning tree protocol processor when said port through which said frame was received is found to be operable under said spanning tree protocol;

said second transmission means for determining whether a frame received from said spanning tree protocol processor is a bridge protocol data unit, and for transmitting said frame received from said spanning tree protocol processor to a destination port designated by said frame received from said spanning tree protocol processor when said frame received from said spanning tree protocol processor is found to be a bridge protocol data unit;

wherein said spanning tree protocol processor comprises third transmission means for determining whether the frame transmitted from said bridging facility is a bridge protocol data unit, for performing said spanning tree protocol calculations when the frame transmitted from said bridging facility is found to be a bridge protocol data unit, and for transmitting said frame found to be a bridge protocol data unit to the bridging facility connected to the port which is connected to a destination network designated through said spanning tree protocol calculations.

11. A network system according to claim 8, wherein each bridge further comprises means for holding port status information derived from calculations performed by said spanning tree protocol processor regarding each of said ports.

12. A network system according to claim 8, wherein each bridge further comprises a plurality of said bridging facilities, each of said bridging facilities including filtering database synchronization means for updating the filtering database of the bridging facility that includes said filtering database synchronization means, in synchronism with all other bridging facilities within the bridge, so that the contents of the filtering databases of all bridging facilities within the bridge are kept identical.

13. A network system according to claim 12, wherein each said filtering database synchronization means comprises notification means for notifying the other bridging facilities within the bridge of any update in the filtering database of the bridging facility that includes said filtering database synchronization means, and update means for updating the filtering database of the bridging facility including said filtering database synchronization means in accordance with a filtering database update notice from the notification means of any other bridging facility within the bridge.

14. A multiprocessor bridge comprising:

a plurality of ports for transmitting and receiving frames to and from networks;

at least one filtering database for holding filtering information;

at least one bridging processor connected to said plurality of ports for repeating said frames and for filtering said frames transmitted and received through said ports by said filtering information;

a spanning tree protocol processor for executing a spanning tree protocol; and a communication path via which said frames are transmitted and received between each said bridging processor and said spanning tree protocol processor;

wherein said spanning tree protocol processor comprises a first memory for holding spanning tree operation mode information indicating whether each of said ports within the bridge is operable under said spanning tree protocol; and wherein each of said plurality of bridging processors comprises a second memory for holding spanning tree operation mode information indicating whether each of said ports connected to the bridging processor is operable under said spanning tree protocol.

15. A multiprocessor bridge according to claim 14, further comprising a plurality of said bridging processors and a plurality of said filtering databases, wherein each of said plurality of bridging processors incorporates one of said plurality of said filtering databases.

16. A multiprocessor bridge according to claim 15, wherein each of said plurality of bridging processors includes filtering database synchronization means for updating the filtering database of its bridging processor, in synchronism with all other bridging processors within the bridge, so that the contents of the filtering databases of all bridging processors within the bridge are kept identical, wherein said filtering database synchronization means comprises notification means for notifying the other bridging processors within the bridge of a filtering database update in its bridging processor, and update means for updating the filtering database of its bridging processor in accordance with a filtering database update notice from the notification means of another bridging processor within the bridge.

17. A multiprocessor bridge according to claim 14, wherein each of said plurality of bridging processors further comprises:

first transmission means for determining whether a frame, received through any one of said ports connected to the bridging processor, is a bridge protocol data unit subject to spanning tree protocol calculations, for determining, when the received frame is found to be a bridge protocol data unit, whether the port through which said frame was received is operable under said spanning tree protocol, and for transmitting the received frame via said communication path to said spanning tree protocol processor when said port through which said frame was received is found to be operable under said spanning tree protocol; and second transmission means for transmitting said frame of the bridge protocol data unit received from said spanning tree protocol processor to a destination port designated by said frame of the bridge protocol data unit received from said spanning tree protocol processor; and wherein said spanning tree protocol processor further comprises third transmission means for performing said spanning tree protocol calculations in response to a reception of said frame of the bridge protocol data unit, and for transmitting said frame of the bridge protocol data unit to the bridging processor connected to the port which is connected to a destination network designated through said spanning tree protocol calculations.

* * * * *